US006920296B2

(12) United States Patent  
Koike

(10) Patent No.: US 6,920,296 B2  
(45) Date of Patent: Jul. 19, 2005

(54) IMAGE FORMING APPARATUS

(75) Inventor: Michiro Koike, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/704,675

(22) Filed: Nov. 12, 2003

(65) Prior Publication Data

US 2004/0109703 A1 Jun. 10, 2004

Related U.S. Application Data

(62) Division of application No. 10/160,172, filed on Jun. 4, 2002, now Pat. No. 6,661,982.

(30) Foreign Application Priority Data

Jun. 7, 2001 (JP) ......................... 2001-172982

(51) Int. Cl.⁷ .............................. G03G 15/00
(52) U.S. Cl. ..................... 399/82; 399/16; 399/17; 399/367
(58) Field of Search ............................ 399/16, 17, 82, 399/361, 363, 365, 367, 372

(56) References Cited

U.S. PATENT DOCUMENTS

| 5,799,237 | A  | * | 8/1998  | Ueda et al. ............... 399/367 |
| 5,833,227 | A  | * | 11/1998 | Choho et al. ............ 271/10.03 |
| 5,893,011 | A  | * | 4/1999  | Yoshida et al. ........... 399/203 |
| 6,128,451 | A  |   | 10/2000 | Fukuchi .................... 399/75 |
| 6,256,473 | B1 | * | 7/2001  | Kamanuma et al. ...... 399/367 |
| 6,285,852 | B1 |   | 9/2001  | Etoh et al. ................ 399/367 |

* cited by examiner

Primary Examiner—Hoan Tran  
(74) Attorney, Agent, or Firm—Fitzpatrick, Cella, Harper & Scinto

(57) ABSTRACT

An image forming apparatus is controlled so that, in a standby state before an image forming part becomes able to perform image forming, documents are successively conveyed to a predetermined read position on a platen glass by a document feeder and images are read from all the documents, and so that, at the time of document image reading in the standby state, operating noise from the document feeder is reduced.

12 Claims, 12 Drawing Sheets

IMAGE FORMING APPARATUS

This application is a division of application Ser. No. 10/160,172, filed Jun. 4, 2002 now U.S. Pat. No. 6,661,982.

BACKGROUND OF THE INVENTION

1. Field of the Invention

The present invention relates to an image forming apparatus having document conveying means for conveying a document to a predetermined read position. More particularly, the present invention relates to a silent image forming apparatus in which document conveying means can operate with reduced operating noise during a document reading process in a standby state.

2. Description of Related Art

Some conventional image forming apparatuses, e.g., copying machines have an automatic document feeder provided as a means for conveying a document to be read to a predetermined read position. In such image forming apparatuses, a document to be copied is first placed on a document tray of the document feeder and is then conveyed automatically to the position on a platen glass, followed by reading of the document image with reading means.

In recent years, copying machines such as digital copying machines and digital combination machines having functions corresponding to the functions of a copying machine, a facsimile machine and a printer have come on the scene. Such copying machines include a type using a procedure for improving the productivity as described below. During standby before the temperature of a fixing device of the copying machine is increased to a predetermined (fixing) temperature, a document is read before a copying operation and document information obtained by reading the document is stored in a memory to enable the copying operation to be started immediately after the standby state.

On the other hand, automatic document feeders provided in such copying machines include a type designed so as to achieve a space saving effect as well as an improvement in productivity, for example, in such a manner that, while information written on a document separated and taken up from a top of a batch of documents is being read by reading means, a preceding document can be independently discharged in a reversed state.

Further, copying machines having such an automatic document feeder include a machine designed so as to achieve an improvement in productivity and matching with an arrangement relating to discharge of a top page from a printing unit in such a manner that copy output sheets are discharged by reversing discharge (discharge of sheets with the back surface up) in order in correspondence with the order of documents from the first page.

With respect to the above-described conventional copying machines (image forming apparatus), it has been pointed out that, in a case where a copying machine arranged as described above is placed in a quiet office, a user may have a feeling of discomfort due to operating noise caused during standby by the above-described operation for reading a document before a start of a copying operation.

In a case where an arrangement enabling independent reversing discharge of a preceding document is adopted for the purpose of achieving a space saving effect and improving the productivity of a copying machine, the document reversing discharge operation and the discharge operation of a copying machine main unit are performed substantially in synchronization with each other. In this case, therefore, the operating noise caused by the operation of the entire system formed of the copying machine main unit and the automatic document feeder in combination is increased.

The conveying speed for the reversing discharge operation selected to ensure increased productivity is about twice as high as feeding speed and the conveying speed during times other than when the reversing discharge operation is performed. Therefore the operating noise problem with the conveying speed for the reversing discharge operation is particularly serious and the resulting influence on users in a quiet office environment is considerable and there has been a demand for a solution to the problem.

SUMMARY OF THE INVENTION

In view of the above-described circumstances, an object of the present invention is to provide a silent image forming apparatus capable of operating with reduced operating noise.

To achieve the above-described object, according to the present invention, there is provided an image forming apparatus which forms an image on a sheet, including document conveying means for conveying a document to a predetermined read position, reading means for reading an image from the document conveyed to the read position, an image forming part which forms a toner image on and image bearing body on the basis of document image information read by the reading means, the apparatus being characterized in that the apparatus is controlled so that, in a standby state before the image forming part becomes able to perform image forming, documents are successively conveyed to a predetermined read position on a platen glass by the document conveying means and images are read from all the documents, and so that, at the time of document image reading in the standby state, operating noise from the document conveying means is reduced.

Also, according to the present invention, the image forming apparatus is characterized by including detecting means for detecting the standby state, and controlling means for performing in the standby state a control process in which drive of the document conveying means performed by drive means is controlled on the basis of a detection signal from the detecting means so that the operating noise is reduced.

Also, according to the present invention, in the image forming apparatus, it is characterized in that at the time of document image reading in the standby state, the controlling means controls drive of the document conveying means performed by drive means so that the speed at which the document is conveyed is reduced.

Also, according to the present invention, in the image forming apparatus, it is characterized in that at the time of document image reading in the standby state, the controlling means controls drive of the document conveying means performed by drive means so that the document read interval is increased.

Also, according to the present invention, in the image forming apparatus, it is characterized in that the document conveying means includes a reversing discharge part which reverses the document after conveying to the read position and after reading, and discharges the reversed document, and that at the time of document image reading in the standby state, the controlling means controls drive of the document conveying means performed by drive means so that document conveying speed when the reversing discharge is performed is reduced.

Also, according to the present invention, in the image forming apparatus, it is characterized in that the detecting means detects the standby state at least from a fixing temperature of fixing means for fixing, by heating and pressing, a toner image formed on an image bearing body and thereafter transferred onto the sheet in the fixing temperature of the fixing means and a surface potential on the image bearing body.

Also, according to the present invention, in the image forming apparatus, it is characterized in that the controlling means selectively performs a control process in which after the machine has entered a state where image forming can be performed, and after reading of all document images has been completed, the image forming operation by the image forming part is initiated.

Also, according to the present invention, the image forming apparatus is controlled so that, in a standby state before an image forming part becomes able to perform image forming, documents are successively conveyed to the predetermined read position by the document conveying means and images are read from all the documents, and so that, at the time of document image reading in the standby state, operating noise from the document conveying means is reduced.

Also, according to the present invention, as described above, the image forming apparatus is controlled so that, in a standby state before an image forming part becomes able to perform image forming, documents are successively conveyed to the predetermined read position by the document conveying means and images are read from all the documents, and so that, at the time of document image reading in the standby state, operating noise from the document conveying means is reduced. Thus, it is possible to provide a silent image forming apparatus which can operate with a level of operating noise low enough to ensure that a user does not have a feeling of discomfort.

DETAILED DESCRIPTION OF THE PREFERRED EMBODIMENTS

Embodiments of the present invention will be described below in detail with reference to the accompanying drawings.

Figure 1:
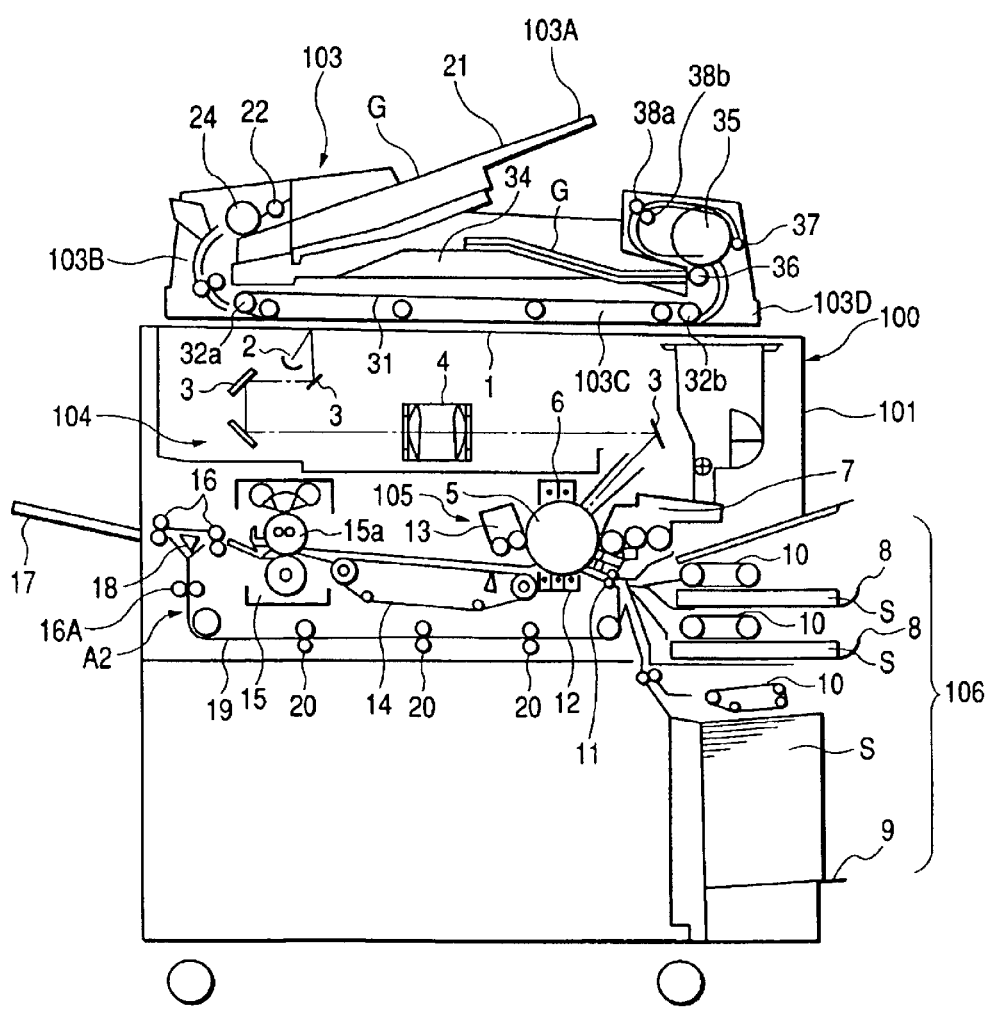
FIG. 1 is a diagram showing a construction of a copying machine which is an example of an image forming apparatus according to a first embodiment of the present invention.

FIG. 1 is a diagram showing a digital copying machine as an example of an image. forming apparatus in accordance with a first embodiment of the present invention.

FIG. 1 illustrates the digital copying machine 100 and a digital copying machine main unit 101 (hereinafter referred to as "main unit"). An automatic document feeder 103 is provided as document conveying means on the upper surface of the main unit 101. A reading device 104 is provided as reading means in an upper section of the main unit 101. An image forming part 105 including a photosensitive body drum 5 provided as an image bearing body is provided in a middle section of the main unit 101.

The automatic document feeder 103 is a device for conveying a document G to a read position at which information written on the document G is read. by the reading device 104. The automatic document feeder 103 has its inner portion hinged on the main unit 101 by means of a hinge unit (not shown) so as to cover a platen glass 1 provided on the upper surface of the main unit 101.

The reading device 104 is a device for irradiating with light from a light source 2 a document G conveyed to the predetermined position on the platen glass 1 by the automatic document feeder 103, and for exposing the photosensitive body drum 5 to image light obtained via a mirror 3 and a lens 4 from the light reflected by the document G.

The image forming part 105 is arranged to form an image on a recording medium S by an electrophotographic process according to the result of image exposure from the reading device 104. In the image forming part 105, the surface of the photosensitive body drum 5 in a state of being driven and rotated is uniformly charged by a primary charger 6, an electrostatic latent image is formed on the photosensitive body drum by image exposure, and this electrostatic latent image is developed with a toner by a developing means 7 to form a toner image.

A part indicated by 106 in FIG. 1 is a sheet feeding part for supplying (feeding) a recording medium S such as plain paper, an OHP sheet and the like into the image forming part 105. In the sheet feeding part 106, recording mediums S accommodated in a detachable sheet cassette 8 or placed on a sheet deck 9 are selectively separated and supplied one after another with a supplying belt 10 so that the sheet feeding part 106 is synchronized with toner image forming. Thereafter, each recording medium S is fed into the image forming part 105 according to the timing of image forming while a skew of the sheet is corrected with registration rollers 11.

When the digital copying machine 100 thus constructed operates to form images, a plurality of documents G set in the automatic document feeder 103 are successively fed to the read position, information is then read from each document G by the reading device 104, and a toner image is formed on the photosensitive body drum surface in the image forming part 105 on the basis of the read information.

A recording medium S is then conveyed to the space between the photosensitive body drum 5 and a transfer charger 12 according to the timing of toner image forming on the photosensitive body drum surface, and the toner image formed on the photosensitive body drum 5 is transferred onto the recording medium S by application of a bias voltage to the transfer charger 12. Residual toner on the photosensitive body drum 5 after the toner image transfer is removed by cleaning means 13.

The recording medium S having the toner image thus transferred thereto is conveyed by a conveying belt 14 to a fixing device 15 which is a fixing means having a fixing roller 15a with a built-in heater. Heat and pressure are applied to the recording medium S by the fixing device 15 to fix the toner image on the recording medium. Finally, the recording medium S is discharged onto a sheet discharge tray 17 by discharge rollers 16.

The digital copying machine 100 of this embodiment has a function for forming images on both the two surfaces of recording medium S. Image forming on the two surfaces of recording medium S is performed as described below. After an image has been formed on one surface of a recording medium S in the above-described manner, the position of a discharge flapper 18 is changed to covey the recording medium S into a reconveying path 19, and the recording medium S is front-rear reversed by switchbacking through the reconveying path 19 and is again conveyed into the image forming part 105 by reconveying rollers 20, followed by image forming on the other surface.

In a case where recording mediums S are discharged in order in correspondence with the order of documents from the first page, each recording medium S is discharged by being reversed by the discharge flapper 18 and a pair of discharge rollers 16A after toner image fixation performed by the fixing device 15. Recording mediums S are thereby discharged with the front surface down.

The automatic document feeder 103 conveys each document G to the read position at which information written on the document G is read by the reading device 104, reverses the document G after reading, and discharges the reversed document G.

Figure 2:
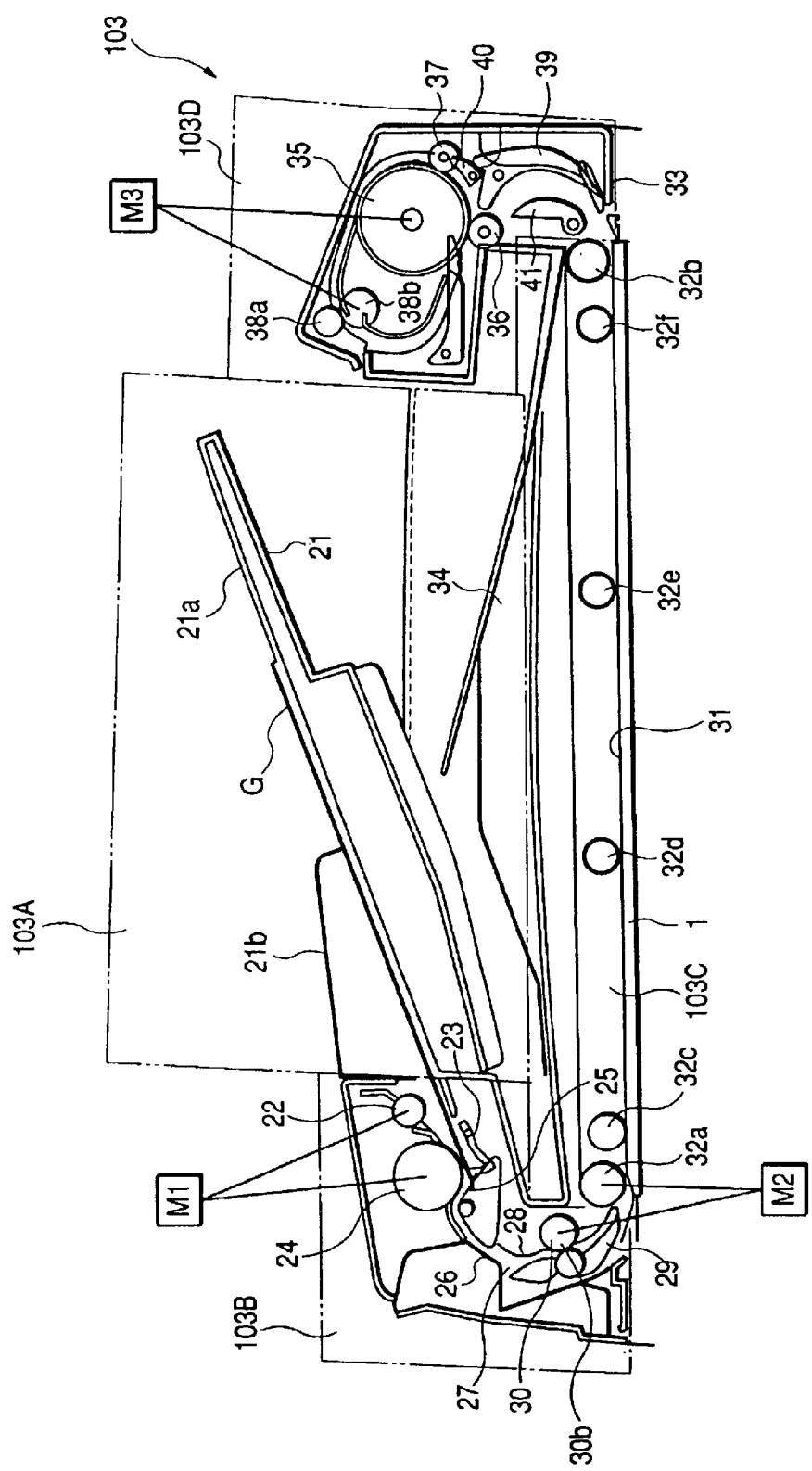
FIG. 2 is a diagram showing a construction of the automatic document feeder shown in FIG. 1.

FIG. 2 is a diagram showing a construction of the automatic document feeder 103. As shown in FIG. 2, the automatic document feeder 103 has a document loading part 103A, a document feeding part 103B, a document conveying part 103C, and a document discharge part 103D.

In the document loading part 103A, a batch of documents G are set on a placement surface 21a of a document feeding tray 21 with the document surface up. The document loading part 103A is provided with side guides 21b which guide each document G set in the tray 21 while abutting on opposite sides of the sheet.

Figure 3:
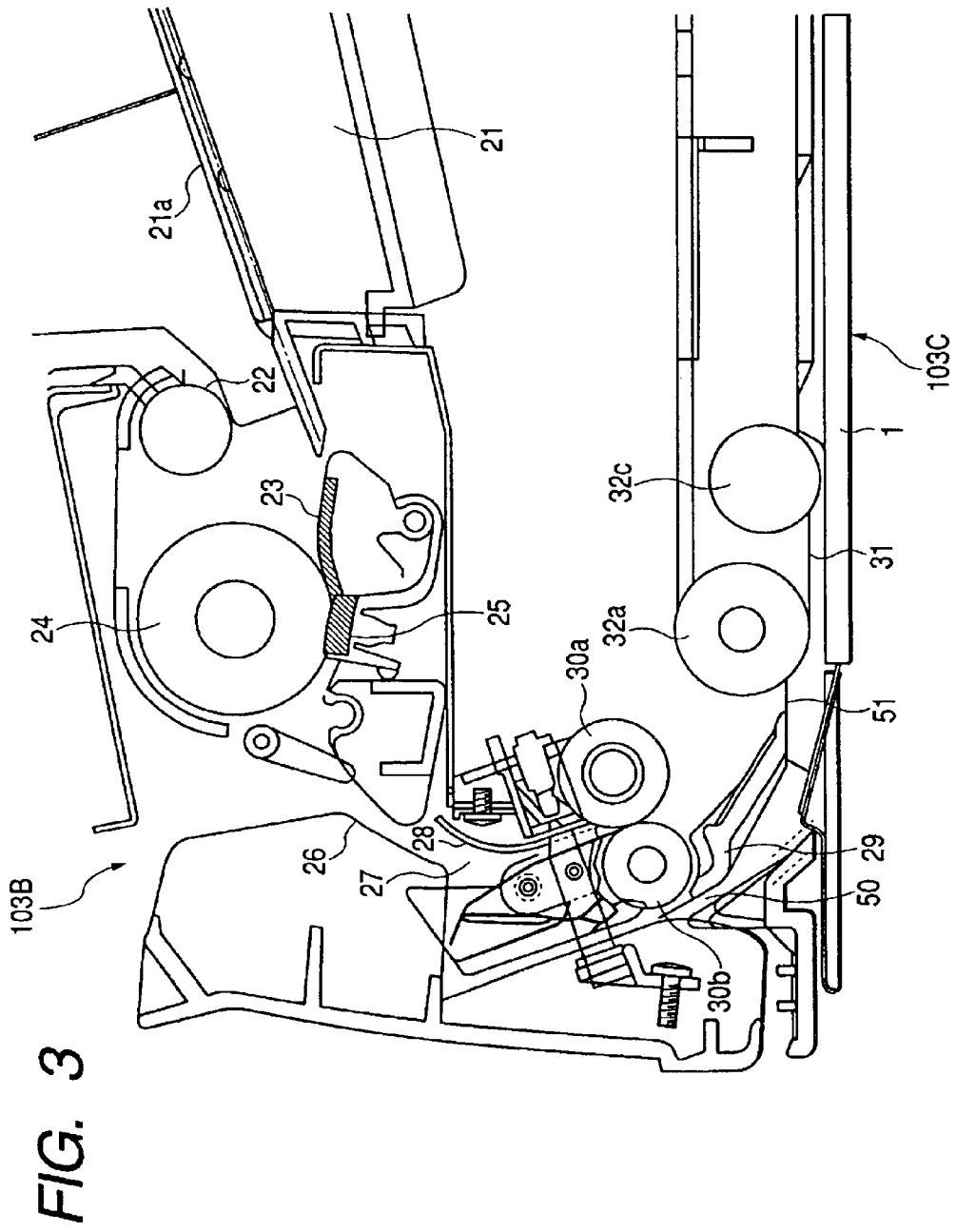
FIG. 3 is an enlarged diagram of a document feeding part in the automatic document feeder.

In the document feeding part 103B, a plurality of documents G set in the document feeding tray 21 are separated one after another at the uppermost position by a contact separation method and is fed into the document conveying part 103C, as shown in FIGS. 2 and 3. The document feeding part 103B is provided with a pickup roller 22, a sheet feeding roller 24, and a pair of registration rollers 30a and 30b.

The pickup roller 22 is mounted so as to be movable upward and downward by an up/down movement mechanism (not shown). At the time of document feeding, a preliminary feed operation is started such that the pickup roller 22 is moved downward onto the batch of documents, while a middle plate 23 is moved upward. A batch of documents is thereby pressed against the sheet feeding roller 24.

Thereafter, the sheet feeding roller 24 and the pickup roller 22 are rotated by a first motor M1 provided as a drive source, thereby feeding the first of documents G. The second and other documents which may be fed forward by following the uppermost document are stopped by a friction member 25 to stay in the document feeding tray 21.

Thereafter, the document G passes through a feeding path 27 formed between a feed guide member 28 and a feed intermediate guide member 29 to reach the pair of registration rollers 30a and 30b while being guided by guide members 26. The pair of registration rollers 30a and 30b are in a stopped state when the leading edge of the document reaches the rollers. A skew of the document G is corrected by curving th document G with the sheet feeding roller 24 conveying the sheet. The document is thereafter fed into the document conveying part 103C.

The document conveying part 103C is arranged to transport document G to a predetermined read position on the platen glass 1. As shown in FIG. 2, the document conveying part 103C is provided with a conveying belt 31 which is wrapped round a drive roller 32a and a driven roller 32b, and which is pressed against the platen glass 1 by belt pressing rollers 32c, 32d, 32e, and 32f.

The drive roller 32a is driven and rotated by a second motor M2 provided as a drive source. The conveying belt 31 is thereby driven and rotated. As the conveying belt 31 is rotated, a document G fed from the document feeding part 103B enters the gap between the conveying belt 31 and the platen glass 1 and is conveyed along the upper surface of the platen glass by a frictional force from the conveying belt 31.

When the document G is conveyed to the predetermined position on the platen glass 1 by the conveying belt 31 as described above, a second motor M2 stops driving and the document G is thereby stopped at the predetermined position. In this state, an image is read from the document G by the reading device 104.

After this image reading, if the document G is of an ordinary size, it is conveyed rightward as viewed in FIG. 2 by the second motor M2 again operated for driving. The document G is thereby conveyed into the document discharge part 103D while being guided by a takeoff guide 33.

In the case of reading from a document of a small size, if there is another document which follows, the automatic document feeder 103 conveys the following document to the predetermined position by the rotation of the conveying belt 31, as it does when conveying the preceding document. During reading from the following document, the automatic document feeder 103 reverses the front and rear surfaces of the preceding document in the document discharge part 103D before discharging onto a discharged document support 34, as described below.

Figure 4:
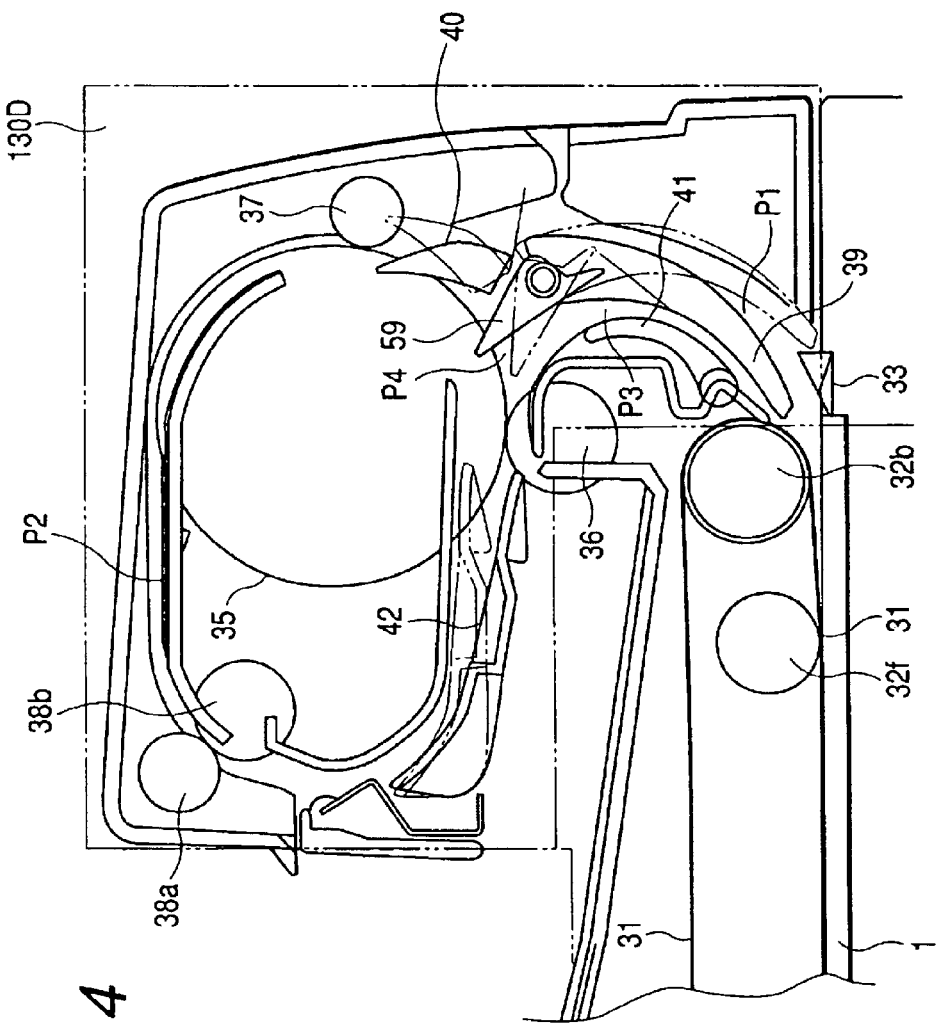
FIG. 4 is an enlarged diagram of a document discharge part in the automatic document feeder.

The document discharge part 103D is arranged to reverse and discharge a document G after reading. As shown in FIGS. 2 and 4, the document discharge part 103D is provided with an instruction path P1, a turnover path P2, a discharging path P3, a conveying and discharging path P4, a reversing roller 35, and driven rollers 36 and 37 contacting and pressuring the reversing roller 35. A pair of conveying rollers 38a and 38b are provided with the turnover path P2. The document discharge part 103D is further provided with a swingable flapper 39 for enabling document G to enter the introduction path P1 or the discharging path P3 at the time of discharge, an engageable flapper 40, a follower flapper 41, and a swingable guide 42.

The automatic document feeder 103 of this embodiment has a small-size document discharge mode, a large-size document discharge mode, and a two-side read/discharge mode for reading from the two surfaces of document G according to the size of a document. The reversing roller 35, the flappers 39 to 41 and the swingable guide 42 are operated according to one of these discharge modes.

Each of these document discharge modes will now be described.

The small-size document discharge mode will first be described with reference to FIGS. 5A, 5B, 6A, 6B, 7A, and 7B.

Figure 5A:
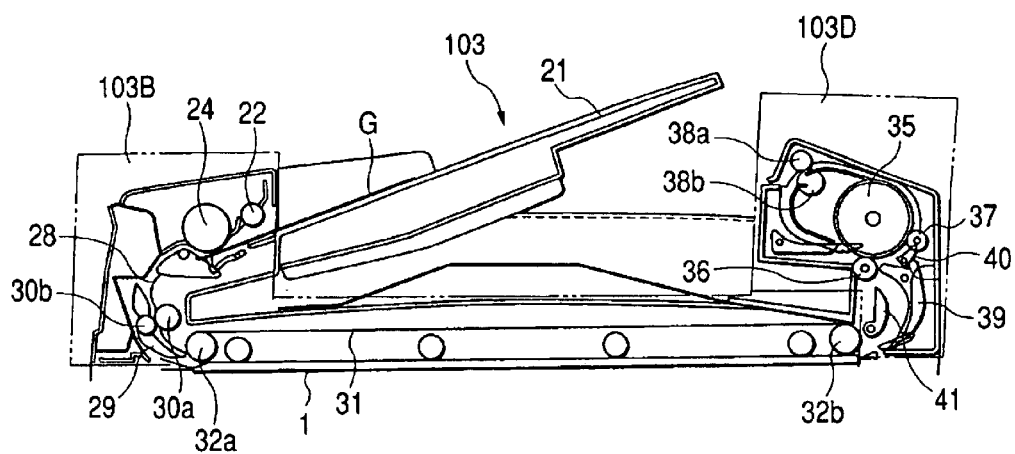
FIGS. 5A and 5B are first diagrams for explaining the operation of the automatic document feeder in a small-size document discharge mode.
Figure 5B:
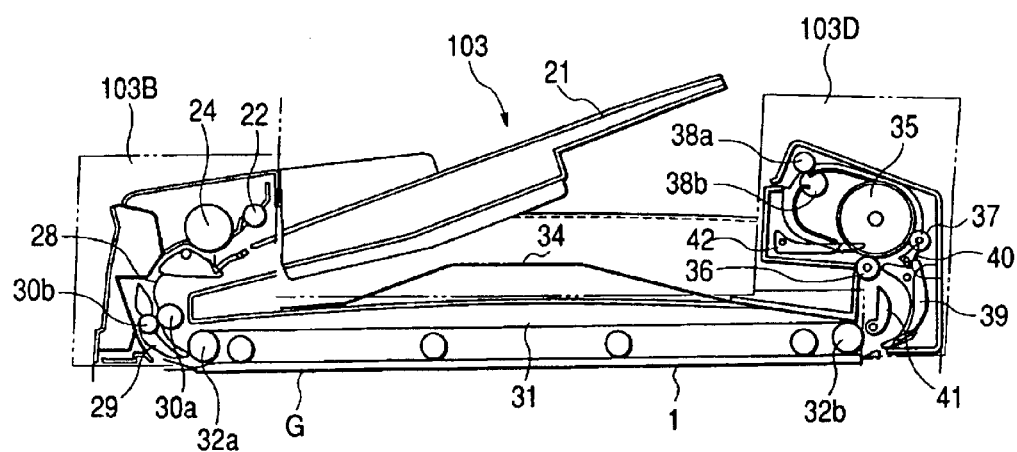

In the small-size document discharge mode, a small-size document G is first set in the document feeding tray 21, as shown in FIG. 5A. This small-size document G is fed by the document feeding part 103B, as shown in FIG. 5B, and is conveyed to the read position on the platen glass 1 by the conveying belt 31.

Figure 6A:
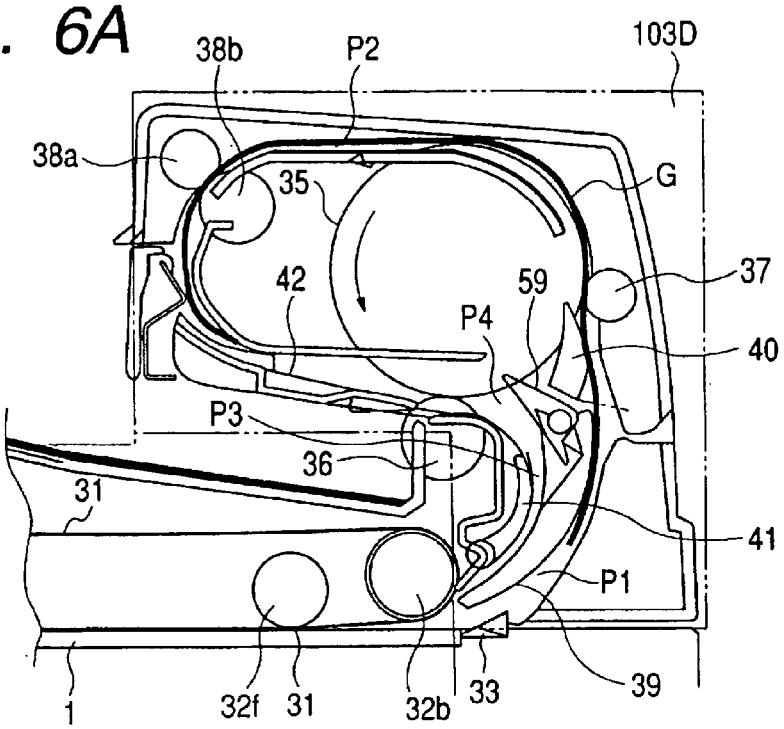
FIGS. 6A and 6B are second diagrams for explaining the operation of the automatic document feeder in the small-size document discharge mode.
Figure 6B:
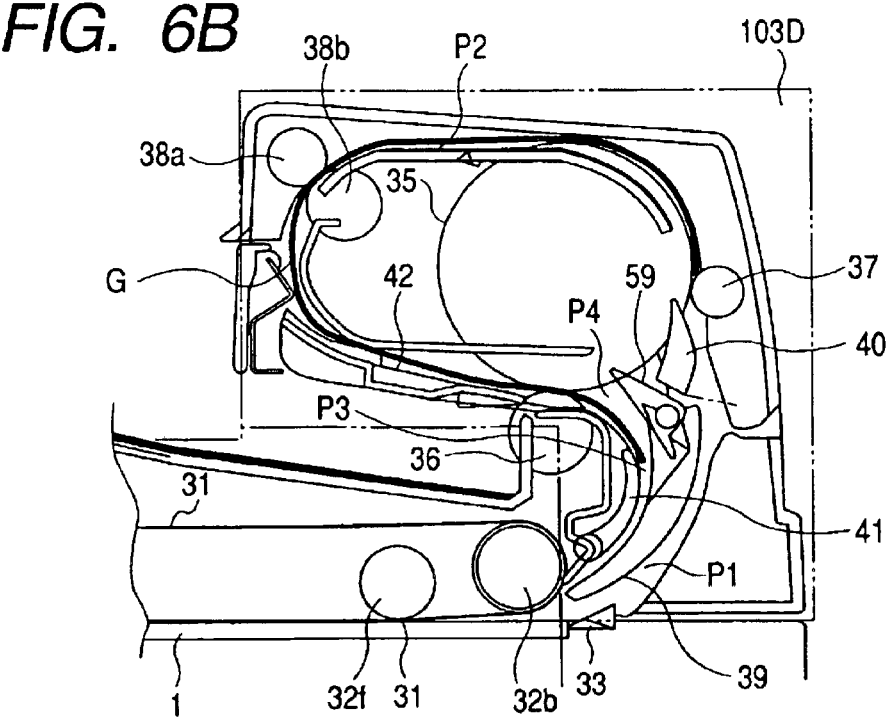

After an image on the document G conveyed to the read portion as described above has been read, the document G is conveyed into the introduction path P1 in the document discharge part 103D by the conveying belt 31, as shown in FIG. 6A. The inverting roller 35 is then driven and rotated in the normal direction (counterclockwise as viewed in FIG. 6A) to convey the sheet into the turnover path P2 and to further convey the sheet to an intermediate position in the discharging path P3, as shown in FIG. 6B.

Figure 7A:
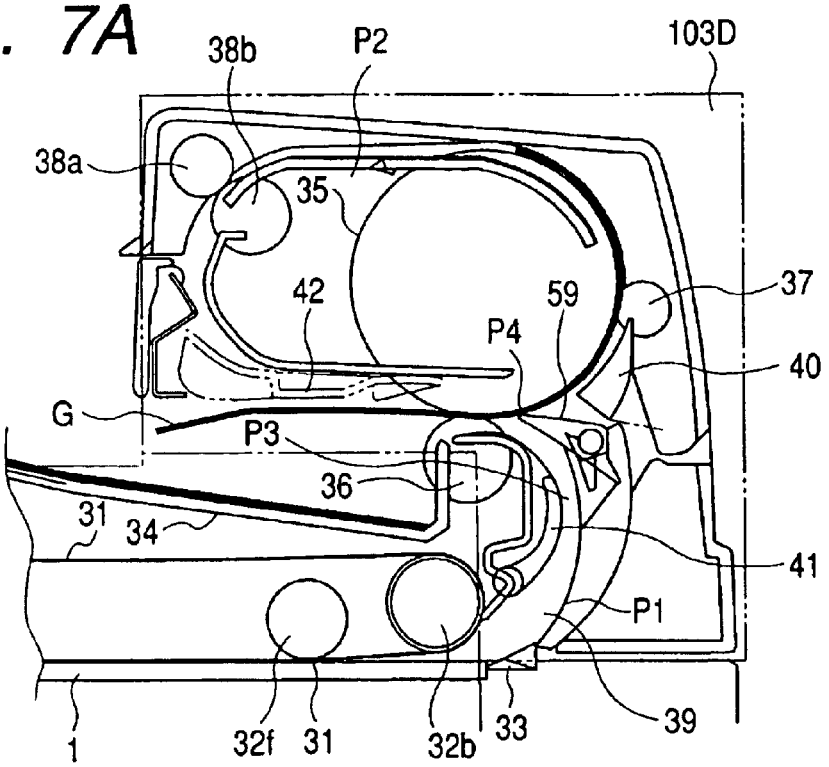
FIGS. 7A and 7B are third diagrams for explaining the operation of the automatic document feeder in the small-size document discharge mode.
Figure 7B:
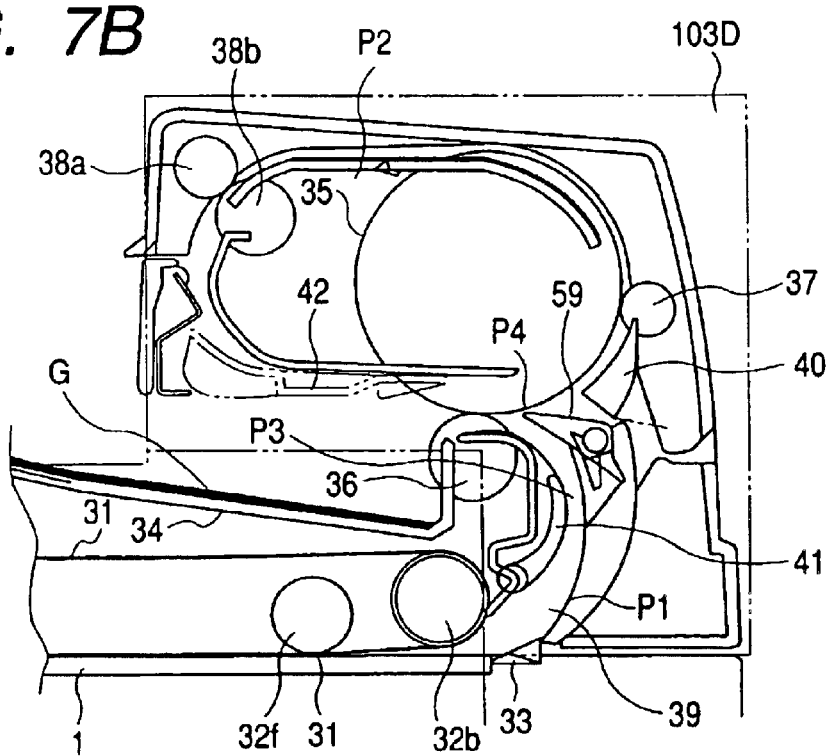

Thereafter, when the trailing end (conveying direction downstream side) of the document enters the turnover path P2, the inverting roller 35 is driven and rotated in the reverse direction (clockwise as viewed in FIG. 6B) and at the same time the operating positions of the flappers 39 to 41 and the swingable guide 42 are changed for switchbacking of the document G. The document G then passes through the conveying and discharging path P4, as shown in FIG. 7A, and is thereafter discharged onto the discharged document support 34 by the reversing roller 35 and the driven roller 36, as shown in FIG. 7B. The document surface of the discharged document G faces downward. Documents G successively discharged in the above-described manner are stacked in page order.

The large-size document discharge mode will next be described with reference to FIGS. 8A, 8B, 9A, and 9B.

Figure 8A:
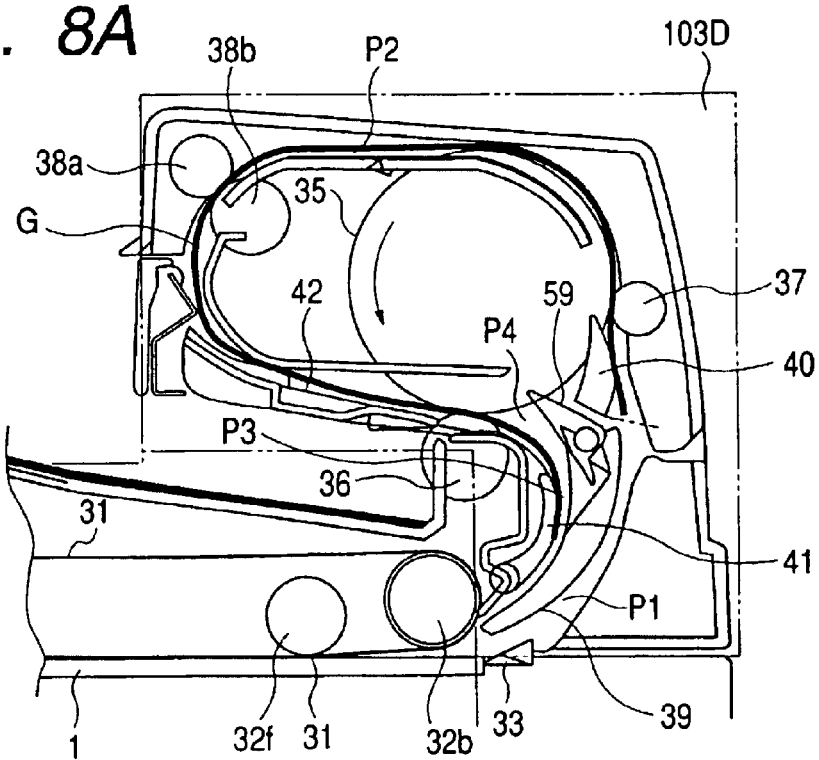
FIGS. 8A and 8B are first diagrams for explaining the operation of the automatic document feeder in a large-size document discharge mode.

In the large-size document discharge mode, when a large-size document G after reading at the read position on the platen glass 1 is conveyed into the document discharge part 103D, it is conveyed from the introduction path P1 into the discharging path P3 through the turnover path P2, as shown in FIG. 8A.

Figure 8B:
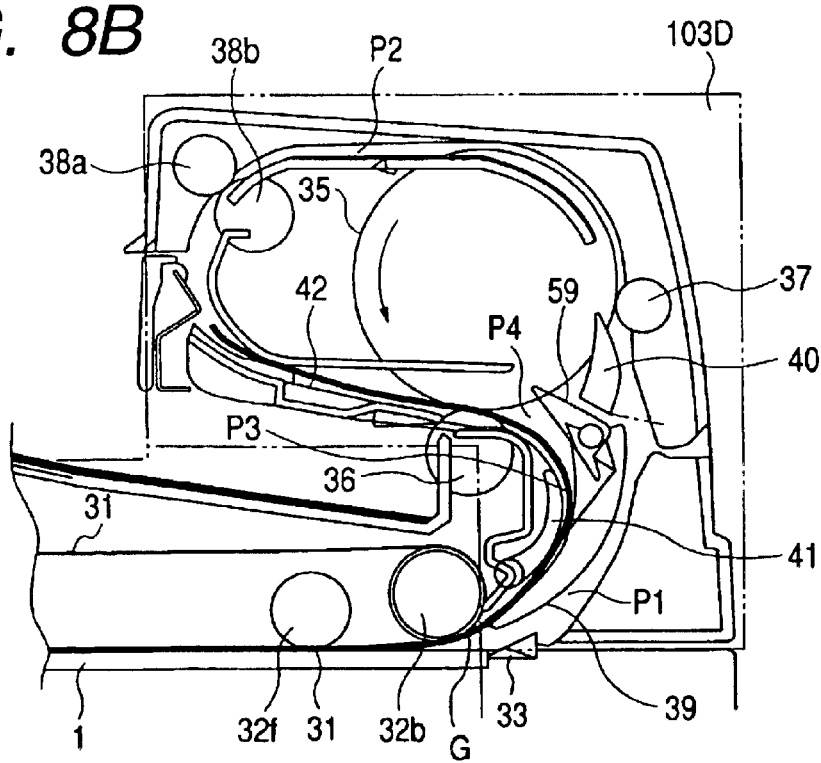

Then the reversing roller 35 is further driven and rotated in the normal direction, while the conveying belt 31 is driven in the reverse direction. The document G is thereby conveyed to a position on the platen glass 1 again, as shown in FIG. 8B. At this time, the document surface of the document G faces upward.

Figure 9A:
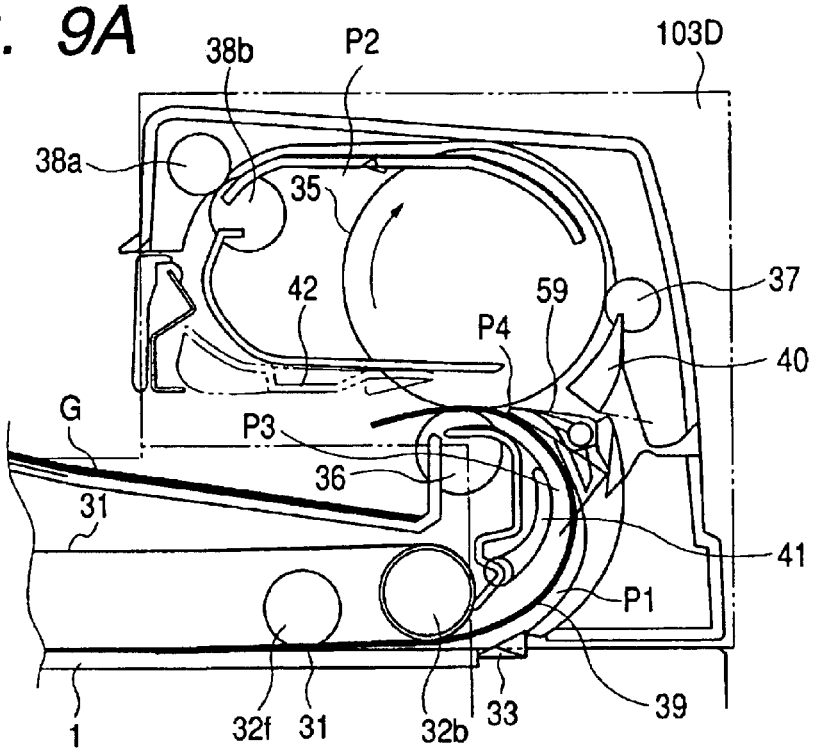
FIGS. 9A and 9B are second diagrams for explaining the operation of the automatic document feeder in a large-size document discharge mode.
Figure 9B:
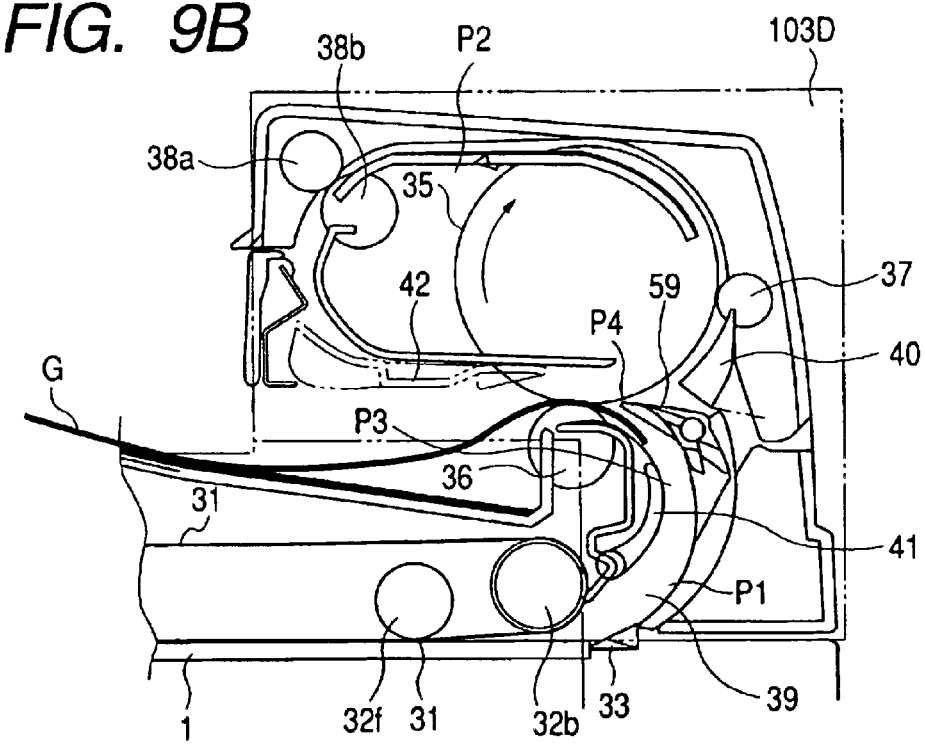

Next, the operating positions of the flappers 39 to 41 and the swingable guide 42 are changed, the conveying belt 31 is driven and rotated in the normal direction, and at the same time the inverting roller 35 is driven and rotated in the reverse direction, thereby switchbacking the document G, as shown in FIG. 9A. Thereafter, the document G is conveyed through the discharging path P3 to be discharged onto the discharged document support 34 through the gap between the reversing roller 35 and the driven roller 36, as shown in FIG. 9B. The document surface of the discharged document G faces downward. Documents G successively discharged in the above-described manner are stacked in page order, as are small-size documents.

The two-side read/discharge mode will next be described.

In the two-side read/discharge mode, a document from one side of which an image has been read is conveyed to a position on the platen glass 1 by being passed through the paths in the order of introduction path P1, turnover path P2 and discharging path P3 (see FIGS. 8A and 8B), regardless of distinction between the small size and the large size, as is the large-size document in the above-described process. At this time, the other surface of the document G, from which no image has been read, faces downward.

Next, the document G in this state is conveyed to a predetermined position in the document feeding part 103B by further driving and rotating the conveying belt 31 in the reverse direction. The conveying belt 31 is then driven and rotated in the normal direction again to convey the document G to the read position, and reading from the other surface is performed. Thereafter, the document G is conveyed through the discharging path P3 in the document discharge part 103D to be discharged onto the discharged document support 34 through the gap between the reversing roller 35 and the driven roller 36 (see FIGS. 9A and 9B).

In this embodiment, the digital copying machine 100 is arranged to improve the productivity in such a manner that, during standby before the fixing temperature of the fixing device 15 is increased to a predetermined temperature, document contents on all documents G are successively read before the copying operation, and document information obtained by reading is stored in a memory (not shown).

The method of successively reading document contents on all documents G during standby enables the operation for reversing discharge of documents G and the discharge operation of the main unit 101 to be performed without being synchronized with each other. Operating noise from the system formed of the main unit 101 and the automatic document feeder 103 in combination can be reduced in this manner.

Also in this embodiment, to reduce operating noise at the time of document image reading performed before the copying operation as described above, a silent mode is automatically set, for example, such that the document conveying speed in the automatic document feeder 103 is reduced. The arrangement may be such that when such a silent mode is selected, all the conveying speeds of processes from document feed to document discharge are reduced, or only the speed for reversing discharge having particularly large influence on operating noise is reduced.

Further, the arrangement may be such that the conveying speed is not changed but the time interval between the completion of reading from a pr ceding document by the reading device 104 and a start of reading from the next document is increased.

The conveying speed or the read interval is set to such a value that document image reading can be completed during standby before the surface temperature of the fixing roller 15a is increased to the predetermined temperature.

The operation for reducing operating noise in the copying machine thus arranged will next be described.

Figure 10:
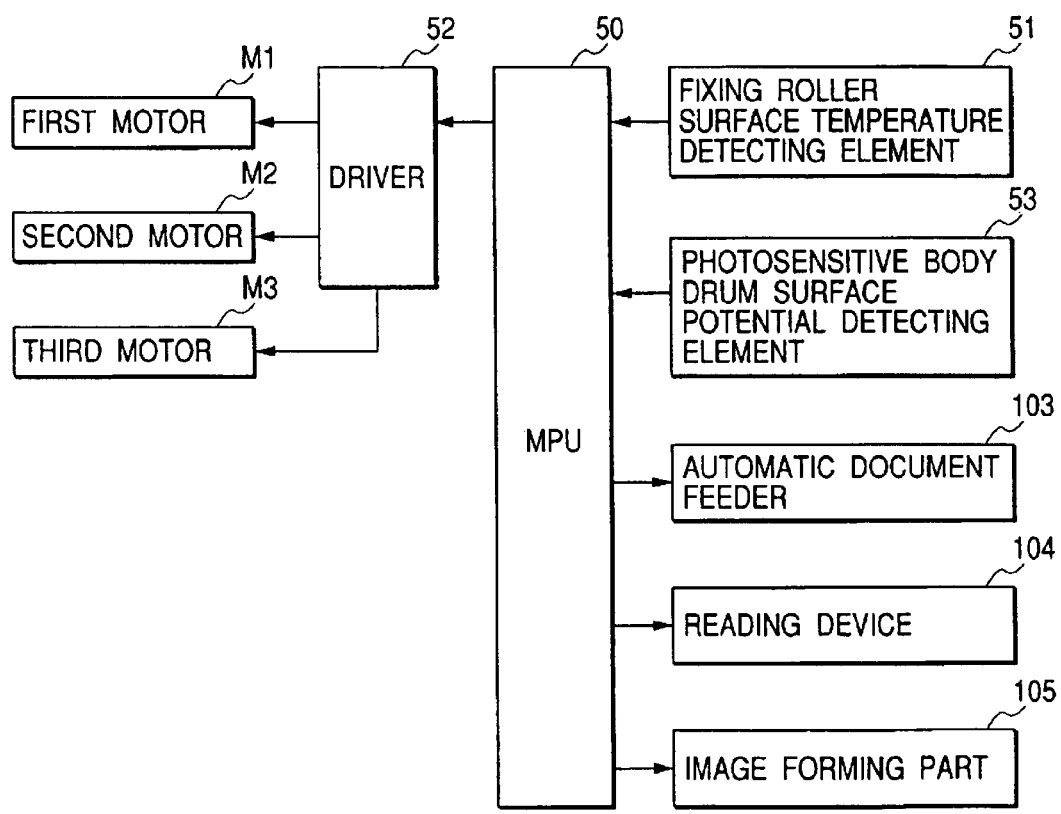
FIG. 10 is a control block diagram of the automatic document feeder.

First, immediately after the power for the main unit 101 has been turned on, documents G are set in the automatic document feeder 103 and a copy start key of the digital copying machine 100 is pressed. Then a microprocessor unit (MPU) 50 shown in FIG. 10 as a controlling means for controlling the digital copying machine 100 detects the surface temperature of the fixing roller 15a with a built-in heater by means of a fixing roller surface temperature detecting element 51.such as a thermistor. The MPU 50 controls the copying machine so that the copying operation is not started if this surface temperature is lower than the predetermined temperature, that is, if the copying machine is in the standby state.

On the other hand, when the copy start key is pressed as described above, the MPU 50 outputs a control signal to the automatic document feeder 103 to start feeding of documents G, and outputs a control signal to the reading device 104 to start reading from the document G fed and conveyed to the position on the platen glass 1.

Further, at this time, the MPU 50 controls through a driver 52 the first to third motors M1, M2, and M3 provided in the automatic document feeder 103 to make the automatic document feeder 103 operate in the silent mode.

For example, in the case where all the speeds of conveyance from document feed to document discharge are reduced, the rotational speeds of the first to third motors M1, M2, and M3 are reduced. In the case where only the speed for reversing discharge having particularly large influence on operating noise is reduced, the rotational speed of the third motor M3 (and that of the second motor M2 if necessary) is reduced.

While the operation has been described with respect to a stage immediately after turning-on of the power for the main unit 101, the same control in the silent mode may also be performed in a case where the machine is in a copy wait state, e.g., in an energy saving mode such that, even after the power for the main unit 101 has already been turned on, the surface temperature of the fixing roller 15a is set to lower than the predetermined temperature.

The above-described recognition of the standby state may be performed by using not only the signal from the fixing roller surface temperature detecting element 51 provided as means for detecting the standby state but also a signal from a photosensitive drum surface potential detecting element 53 (see FIG. 10) provided as another detecting means for potential control according to the sensitivity of the photosensitive drum 5.

The operation for reducing operating noise in the copying machine thus arranged will next be described with reference to the flowchart of FIG. 11.

First, immediately after the power for the main unit 101 has been turned on, if documents G are set in the automatic document feeder 103, and if the copy start key of the digital copying machine 100 is turned on (Yes in S100), the MPU 50 detects whether the surface temperature of the fixing roller 15a has been increased to the predetermined temperature with the fixing roller surface temperature detecting element 51 (S101).

If the-surface temperature of the fixing roller 15a has not been increased to the predetermined temperature, that is, the machine is in the standby state (No in S101), the MPU 50 controls the machine so that the copying operation is not started. Simultaneously, the MPU 50 initiates reading from the document is started (S102). When reading from all the documents is completed (Yes in S103), the MPU 50 again detects whether the surface temperature of the fixing roller 15a has been increased to the predetermined temperature (S101).

When the surface temperature of the fixing roller 15a is increased to the predetermined temperature after the completion of reading from all the documents (Yes in S101), the MPU 50 detects whether a predetermined level of surface potential of the photosensitive drum 5 has been reached with the photosensitive drum surface potential detecting element 52 (S104).

When the MPU 50 detects that the predetermined level of surface potential of the photosensitive drum 5 has been reached with the photosensitive drum surface potential detecting element 52 (Yes in S104), it activates the machine from the standby state to start image forming on recording medium S (S105) and controls the machine to perform image forming so that the machine completes image forming (Yes in S106).

As described above, reading of images from all documents is performed when the digital copying machine 100 is in the standby state, and document image reading in the standby state is performed in a silent mode such that the conveying speed is reduced or the document G read interval is increased. Thus, the silent automatic document feeder 103 can be provided as a silent apparatus capable of operating with reduced operating noise, and the digital copying machine 100 can also be provided as a silent machine capable of operating with reduced operating noise.

Consequently, operating noise from the digital copying machine 100, which may make a user uncomfortable, can be reduced without any considerable influence on the productivity of the digital copying machine 100. Needless to say, the present invention is not limited to the. automatic document feeder 103 including the arrangement for reversing discharge of sheets.

A second embodiment of the present invention will be described.

In the second embodiment of the present invention, a digital copying machine 100 including an automatic document feeder 103 having a feature for reversing discharge of sheets is designed to reduce a peak of operating noise caused by the system formed of the main unit 101 and the automatic document feeder 100 in combination in such a manner that the document reversing discharge operation is first performed and the reversing discharge operation of the main unit 101 is thereafter performed.

Figure 12:
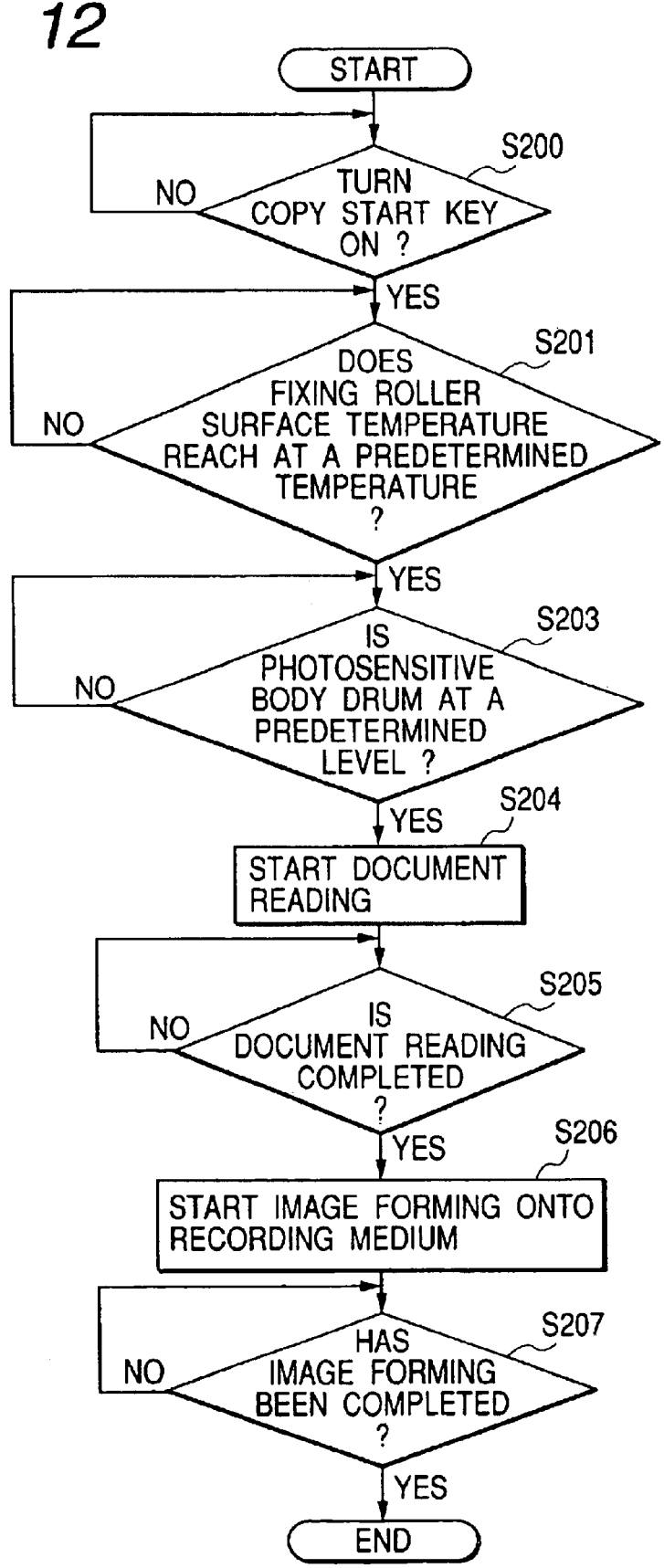
FIG. 12 is a flowchart showing an operation for reducing operating noise in an image forming apparatus according to a second embodiment of the present invention.

The operation for reducing operating noise in accordance with this embodiment will be described with reference to the flowchart of FIG. 12.

In this embodiment, first, immediately after the power for the main unit 101 has been turned on, when documents G are set in the automatic document feeder 103 and the copy start key of the digital copying machine 100 is turned on (Yes in S200), the MPU 50 detects whether the surface temperature of the fixing roller 15a has been increased to a predetermined temperature with the fixing roller surface temperature detecting element 51 (S201).

Then, when the surface temperature of the fixing roller 15a is increased to the predetermined temperature (Yes in S201), the MPU 50 detects whether a predetermined level of surface potential of the photosensitive drum 5 has been reached with the photosensitive drum surface potential detecting element 52 (S203).

And then, when the MPU 50 detects that the predetermined level of surface potential of the photosensitive drum 5 has been reached with the photosensitive drum surface potential detecting element 52 (Yes in S203), it activates the machine from the standby state. The MPU 50 thus activates the machine from the standby state and initiates reading from the documents (S204). The documents set with the front surface up are successively conveyed from the uppermost position, reading from each document is performed by the image reading device 104, and image information obtained from the documents is stored in the memory.

Finally, when reading from all the documents is completed (Yes in S205) and when reversing discharge of the documents is completed, the MPU 50 initiates image forming on recording mediums S (S206) and controls the image forming part 105 to perform image forming until the machine completes image forming (Yes in S207). The recording mediums S on which images have been formed in the above-described manner and which have undergone toner image fixing by the fixing device 15 are discharged in order in correspondence with the order of the documents from the first page by reversing discharge performed by the discharge flapper 18 and the pair of discharge rollers 16A, the front surface of each discharged recording medium S facing downward.

The above-described method of performing reversing discharge of output sheets by the image forming part 105 after the completion of the operation for reversing discharge of documents G eliminates the overlap of the document G reversing discharge operation and the reversing discharge operation of the main unit 101, thus reducing the peak of operating noise.

The arrangement of this embodiment entails the drawback of reducing the productivity of one-to-one image forming (copying). However, the arrangement may be such that a user him/herself can select the operation for avoiding overlapping of the document reversing discharge operation and the reversing discharge operation of the digital copying machine 100, for example, through an operating panel of the digital copying machine, thus enabling the user to determine whether to give precedence to the productivity or to the operating noise reducing effect according to his or her need. The arrangement of this embodiment is advantageous in this respect.

What is claimed is:

1. An image forming apparatus for forming an image on a sheet, said apparatus comprising:
    document conveying means for conveying a document on a reading position;
    reading means for reading an image on the document conveyed on the reading position;
    an image forming part for forming an image based on image information of the document read by said reading means; and
    control means for controlling conveying of a document in a standby state before being capable of image forming by said image forming part,
    wherein said control means controls a conveying of the document so as to reduce an operating noise of said document conveying means in the standby state.

2. An image forming apparatus according to claim 1, wherein said control means controls the conveying of the document so that a document conveying speed in the standby state is slower than a document conveying speed in a normal state where an image can be formed.

3. An image forming apparatus according to claim 1, wherein said control means controls the conveying of the document so that an interval between a preceding document and a following document in the standby state is longer than an interval between a preceding document and the following document in a normal state wherein an image can be formed.

4. An image forming apparatus according to claim 1,
    wherein said document conveying means comprises a reversing discharge part which reverses and discharges a document after an image on the document is read out, and
    wherein said control means controls the conveying of the document so that a document reversing/discharging speed in the standby state is slower than a document reversing/discharging speed in a normal state wherein an image can be formed.

5. An image forming apparatus according to claim 1, further comprising fixing means for fixing an image on a sheet onto which an image is formed,
    wherein said control means releases a standby state in a case that a fixing temperature of said fixing means reaches a predetermine fixing temperature.

6. An image forming apparatus according to claim 5, wherein said control means controls the conveying of the document to complete a reading of the document by said reading means by a time when the fixing temperature of said fixing means reaches the predetermined fixing temperature.

7. An image forming apparatus for forming an image on a sheet, said apparatus comprising:
    a document conveyer to convey a document on a reading position;
    an image reader to read an image on the document conveyed on the reading position;
    an image forming part to form an image based on image information of the document read by said image reader; and
    a controller to control conveying of a document in a standby state before being capable of image forming by said image forming part,
    wherein said controller controls a conveying of the document so as to reduce an operating noise of said document conveyer in the standby state.

8. An image forming apparatus according to claim 7, wherein said controller controls the conveying of the document so that a document conveying speed in the standby state is slower than a document conveying speed in a normal state wherein an image can be formed.

9. An image forming apparatus according to claim 7, wherein said controller controls the conveying of the document so that an interval between a preceding document and a following document in the standby state is longer than an interval between the preceding document and the following document in a normal state wherein an image can be formed.

10. An image forming apparatus according to claim 7, wherein said document conveyor comprises a reversing discharge part capable of reversing and discharging a document after an image on the document is read out, and
    wherein said controller controls the conveying of the document so that a document reversing/discharging speed in the standby state is slower than a document reversing/discharging speed in a normal state wherein an image can be formed.

11. An image forming apparatus according to claim 7, further comprising a fixer configured to fix an image on a sheet onto which an image is formed,
    wherein said controller releases a standby state in a case that a fixing temperature of said fixer reaches a predetermined fixing temperature.

12. An image forming apparatus according to claim 11, wherein said controller controls the conveying of the document to complete a reading of the document by said image reader by a time when the fixing temperature of said fixer reaches the predetermined fixing temperature.

* * * * *

UNITED STATES PATENT AND TRADEMARK OFFICE
CERTIFICATE OF CORRECTION

PATENT NO. : 6,920,296 B2  
DATED : July 19, 2005  
INVENTOR(S) : Michiro Koike

Figure 11:
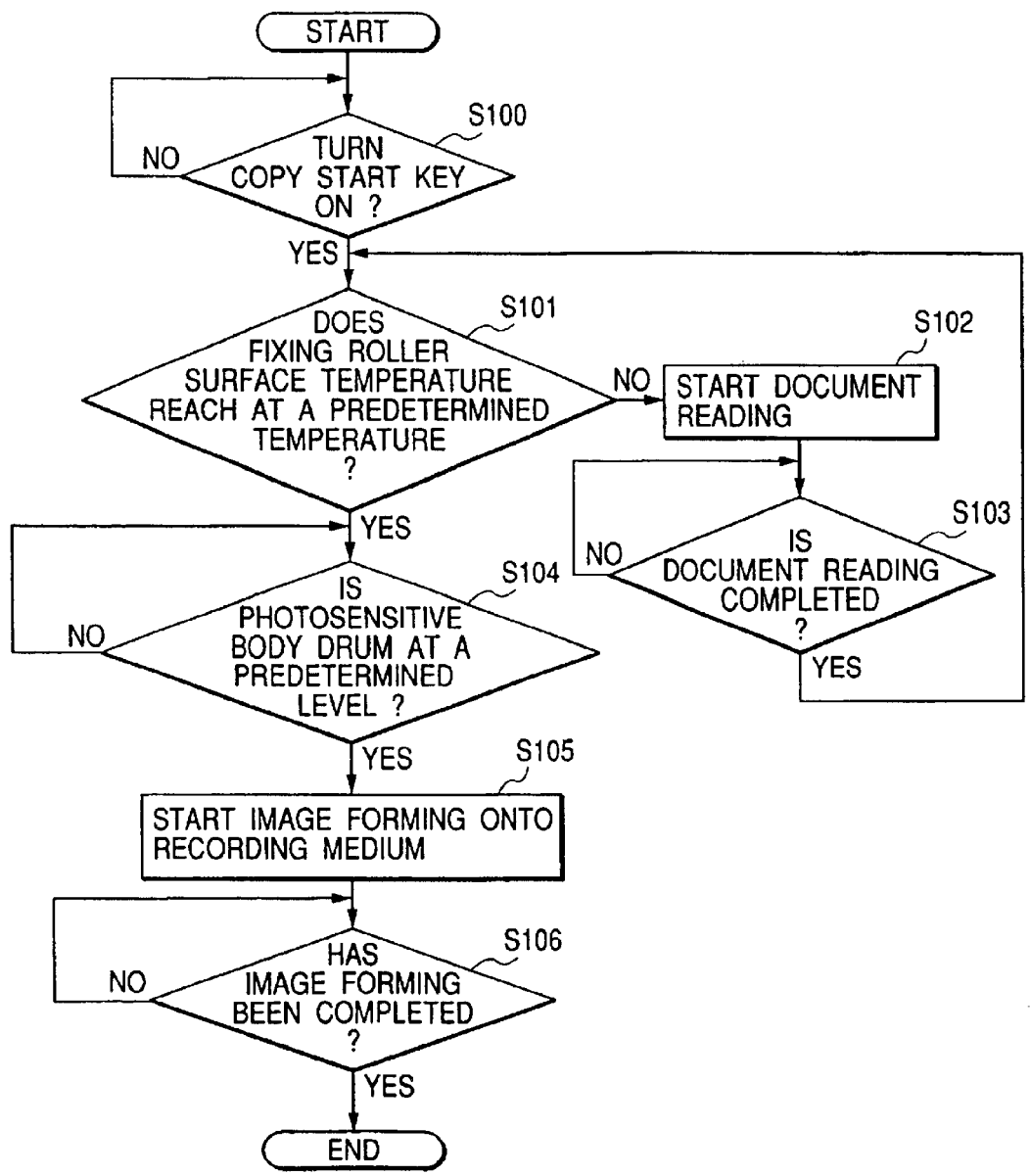
FIG. 11 is a flowchart showing an example of an operation for reducing operating noise in the automatic document feeder.

It is certified that error appears in the above-identified patent and that said Letters Patent is hereby corrected as shown below:

<u>Drawings,</u>  
Sheet 11, Figure 11, "REACH AT" should read -- REACH --.  
Sheet 12, Figure 12, "REACH AT" should read -- REACH --.

<u>Column 4,</u>  
Line 11, "image." should read -- image --; and  
Line 25, "read." should read -- read --.

<u>Column 8,</u>  
Line 48, "pr ceding" should read -- preceding --; and  
Line 66, "51.such" should read -- 51 such --.

<u>Column 9,</u>  
Line 53, "is started" should be deleted.

<u>Column 10,</u>  
Line 21, "the." should read -- the --.

<u>Column 12,</u>  
Line 9, "predetermine" should read -- predetermined --.

Signed and Sealed this

Thirteenth Day of December, 2005

JON W. DUDAS  
*Director of the United States Patent and Trademark Office*